US007945791B2

(12) United States Patent
Orlando et al.

(10) Patent No.: US 7,945,791 B2
(45) Date of Patent: May 17, 2011

(54) PROTECTED STORAGE OF A DATUM IN AN INTEGRATED CIRCUIT

(75) Inventors: William Orlando, Peynier (FR); Luc Wuidart, Pourrieres (FR); Michel Bardouillet, Rousset (FR); Pierre Balthazar, Aix En Provence (FR)

(73) Assignee: STMicroelectronics S.A., Montrouge (FR)

( * ) Notice: Subject to any disclaimer, the term of this patent is extended or adjusted under 35 U.S.C. 154(b) by 29 days.

(21) Appl. No.: 11/960,740

(22) Filed: Dec. 20, 2007

(65) Prior Publication Data

US 2008/0104420 A1    May 1, 2008

Related U.S. Application Data

(62) Division of application No. 10/167,331, filed on Jun. 11, 2002, now Pat. No. 7,334,131.

(30) Foreign Application Priority Data

Jun. 11, 2001    (FR) ...................................... 01 07591

(51) Int. Cl.
*G06F 12/14*    (2006.01)
*G06F 11/30*    (2006.01)
*G06F 21/00*    (2006.01)

(52) U.S. Cl. ........ 713/193; 713/189; 713/190; 713/192; 713/168; 380/264; 380/265; 380/28; 711/163; 711/154

(58) Field of Classification Search .................. None
See application file for complete search history.

(56) References Cited

U.S. PATENT DOCUMENTS

| 5,818,738 | A | * | 10/1998 | Effing ........................... 702/117 |
| 5,887,065 | A |   | 3/1999  | Audebert |
| 5,917,909 | A |   | 6/1999  | Lamla |
| 6,028,445 | A |   | 2/2000  | Lawman |
| 6,067,621 | A |   | 5/2000  | Yu et al. |
| 6,085,323 | A |   | 7/2000  | Shimizu et al. |
| 6,161,213 | A | * | 12/2000 | Lofstrom ................. 324/750.15 |
| 6,192,436 | B1 |  | 2/2001  | Jacobson et al. |
| 6,223,984 | B1 |  | 5/2001  | Renner et al. |
| 6,233,339 | B1 | * | 5/2001 | Kawano et al. ................. 380/44 |
| 6,299,069 | B1 |  | 10/2001 | Shona |
| 6,351,813 | B1 |  | 2/2002  | Mooney et al. |

(Continued)

FOREIGN PATENT DOCUMENTS

DE    198 43 424 A    3/2000

(Continued)

OTHER PUBLICATIONS

French Search Report from French Patent Application 01/07591, filed Jun. 11, 2001.

(Continued)

*Primary Examiner* — Syed A. Zia
(74) *Attorney, Agent, or Firm* — Lisa K. Jorgenson; James H. Morris; Wolf, Greenfield & Sacks, P.C.

(57) ABSTRACT

A method for protecting at least one first datum to be stored in an integrated circuit, including, upon storage of the first datum, performing a combination with at least one second physical datum coming from at least one network of physical parameters, and only storing the result of this combination, and in read mode, extracting the stored result and using the second physical datum to restore the first datum.

15 Claims, 3 Drawing Sheets

U.S. PATENT DOCUMENTS

| | | | |
|---|---|---|---|
| 6,442,525 B1 * | 8/2002 | Silverbrook et al. | 705/50 |
| 6,615,351 B1 * | 9/2003 | Sedlak et al. | 713/172 |
| 6,654,889 B1 | 11/2003 | Trimberger | |
| 6,657,535 B1 | 12/2003 | Magbie et al. | |
| 6,691,921 B2 | 2/2004 | Endo et al. | |
| 6,769,062 B1 | 7/2004 | Smeets et al. | |
| 6,829,356 B1 | 12/2004 | Ford | |
| 6,829,367 B1 | 12/2004 | Toyokawa et al. | |
| 6,948,065 B2 | 9/2005 | Grawock | |
| 7,005,733 B2 | 2/2006 | Kommerling et al. | |
| 7,017,043 B1 * | 3/2006 | Potkonjak | 713/176 |
| 7,191,340 B2 * | 3/2007 | Wuidart et al. | 713/189 |
| 7,564,345 B2 * | 7/2009 | Devadas et al. | 340/539.1 |
| 7,681,103 B2 * | 3/2010 | Devadas et al. | 714/752 |
| 7,702,927 B2 * | 4/2010 | Devadas et al. | 713/194 |
| 7,757,083 B2 * | 7/2010 | Devadas et al. | 713/168 |
| 7,818,569 B2 * | 10/2010 | Devadas et al. | 713/168 |
| 7,840,803 B2 * | 11/2010 | Clarke et al. | 713/168 |
| 2001/0037458 A1 | 11/2001 | Kean | |
| 2003/0046560 A1 | 3/2003 | Inomata et al. | |
| 2003/0102493 A1 * | 6/2003 | Wuidart et al. | 257/200 |
| 2003/0103628 A1 * | 6/2003 | Luc et al. | 380/265 |
| 2005/0160095 A1 | 7/2005 | Dick et al. | |
| 2006/0129741 A1 * | 6/2006 | Hillier et al. | 711/5 |

FOREIGN PATENT DOCUMENTS

| | | |
|---|---|---|
| EP | 0 128 672 A1 | 12/1984 |
| EP | 1 86230 A2 | 7/1986 |
| FR | 2 796 175 A1 | 1/2001 |
| GB | 2 140 592 A | 11/1984 |

OTHER PUBLICATIONS

International Search Report from International Application No. PCT/FR2002/001190.

* cited by examiner

US 7,945,791 B2

PROTECTED STORAGE OF A DATUM IN AN INTEGRATED CIRCUIT

RELATED APPLICATIONS

This application is a division of prior application Ser. No. 10/167,331, filed on Jun. 11, 2002, entitled "Protected Storage Of A Datum In An Integrated Circuit" which application is incorporated herein by reference in its entirety.

BACKGROUND OF THE INVENTION

1. Field of the Invention

The present invention relates to the protection of a secret quantity or datum in an integrated circuit, for example, a smart card. "Secret datum" designates, in the sense of the present invention, any digital word representing any datum or address and which is desired to be protected against piracy.

2. Discussion of the Related Art

Many methods are known which enable encryption of data stored in memories external to a central processing unit, whether these memories are volatile or nonvolatile. Such methods make the data read directly from the memory by physical means (by an attack by means of electric sensors to pirate the datum) impossible to use. Such known methods suffer from a drawback, which is that the data encryption key must also be stored in a non-volatile memory (for example, an EEPROM or an OTP memory). This is a weak point of the system since this key may itself be obtained by physical attack.

To improve the security, it has already been provided to scramble the actual encryption key. However, the scrambling conditions are the same for all integrated circuit chips. It is thus possible, for a pirate, to obtain a key from a non-volatile memory of an authentic chip to copy it in chips industrially reproduced in an unauthorized manner, and to thus clone or imitate a series manufacturing, or to deduce encryption elements therefrom.

SUMMARY OF THE INVENTION

The present invention aims at providing a method for protecting a digital datum in an integrated circuit to avoid the possible pirating of this stored datum. More generally, the present invention aims at providing a method of masking, coding, scrambling, encryption, etc. of a datum to be stored in a memory internal or external to an integrated circuit chip.

To achieve these and other objects, the present invention provides a method for storing at least one first datum in a memory, comprising:

performing a combination of said first datum with at least one second physical datum coming from at least one network of physical parameters of an integrated circuit; and storing only the result of this combination.

According to an embodiment of the present invention, the second physical datum is sensible to the technologic and manufacturing variations of said integrated circuit that integrates said physical parameter network.

According to an embodiment of the present invention, the first datum is an address of a program.

According to an embodiment of the present invention, upon writing of the program into a memory, the addresses of some peripherals is replaced with the address of a decoding circuit associated with the position of a protected address in an address table.

According to an embodiment of the present invention, at least one peripheral address is combined with the physical datum, to store the protected address in said address table.

According to an embodiment of the present invention, the second physical datum is stored temporarily.

According to an embodiment of the present invention, the combination used for the storage is made available only once.

According to an embodiment of the present invention, the physical datum is inaccessible from the outside of the integrated circuit.

According to an embodiment of the present invention, the physical datum is common to all chips in a same batch.

According to an embodiment of the present invention, the physical datum is different from one chip to the other in a same batch.

According to an embodiment of the present invention, the memory storing the first datum is internal to the integrated circuit.

According to an embodiment of the present invention, the memory storing the first datum is external to the integrated circuit.

The present invention also provides a method for reading a stored datum, comprising:

reading the stored result; and using said second physical datum to decode this result and provide the first datum.

The present invention also provides a method for protecting at least one first datum to be stored.

According to an embodiment of the present invention, the method is applied to the protection of a secret datum to be stored in an integrated circuit.

The present invention also provides an integrated circuit including:

at least one network of physical parameters;

at least one combiner for coding at least one first datum to be protected by means of a second physical datum provided by said network; and at least one decoder for, in read mode, providing back the first datum in the clear by reusing the physical datum.

According to an embodiment of the present invention, the circuit further comprising at least a first memory for storing said protected datum.

According to an embodiment of the present invention, the combiner is associated with means for invalidating its operation after a writing of a protected datum into the first memory of the circuit.

According to an embodiment of the present invention, the circuit further includes a second memory for storing a program, the first memory being formed by a table of addresses stored in coded form by means of the physical datum.

The foregoing objects, features and advantages of the present invention, will be discussed in detail in the following non-limiting description of specific embodiments in connection with the accompanying drawings.

DETAILED DESCRIPTION

Figure 1:
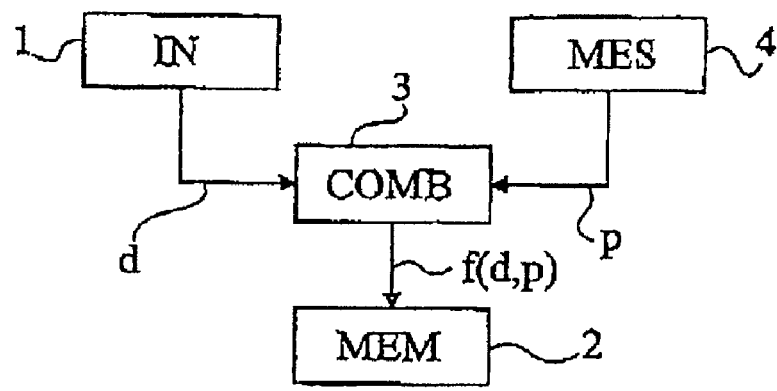
FIG. 1 schematically illustrates, in block diagram form, an embodiment of the method for storing a digital datum according to the present invention.

The same elements have been designated with the same references in the different drawings. For clarity, only those method steps and those elements of the circuit that are necessary to the understanding of the present invention have been shown in the drawings and will be described hereafter. In particular, the method for exploiting the data stored by the present invention, as well as the algorithms for processing these data, are well known and will not be described in detail, except as concerns the provision of the protected datum which is an object of the present invention.

A feature of the present invention is to code a datum to be stored in an integrated circuit chip by combining this datum with a digital word coming from a physical parameter network.

Such a physical parameter network is known, for example, from U.S. Pat. No. 6,161,213 which is incorporated herein by reference, and provides a quantity (generally analog) linked to the integrated circuit chip manufacturing. The quantity provided by the physical parameter network is generally sensitive to technological and manufacturing dispersions and is thus different from one chip batch (wafer or group of wafers) to another, or even from one chip to another in a same batch.

Physical parameter networks are known in authentication methods to guarantee that a datum does come from a valid integrated circuit chip. In particular, a physical parameter network is generally used to detect large-scale pirate manufacturing of clones of integrated circuits, which cannot reproduce the technological parameters specific to the authentic manufacturing. Conventionally, physical parameter networks are used to provide an identifier of the chip, enabling an external device (for example, a smart card reader) to check that the integrated circuit chip really comes from an authentic manufacturing.

In the context of the invention, a physical parameter network provides at least a value (transformable in a digital word) associated with the manufacturing of the integrated circuit and that is, additionally, not observable, in the meaning that the digital word cannot be detected by looking at the chip, contrarily to a fusible network or analog.

According to the present invention, the datum to be stored is stored neither in clear, nor simply encrypted by conventional methods. It is stored in a form completely incomprehensible or unexploitable by a pirate since the digital word with which it is combined is specific to the integrated circuit chip having made the combination. Further, the physical parameter network being preferentially sensitive to technological and manufacturing process dispersions, the word used for the coding is linked to the integrated circuit manufacturing.

"Coding" designates, in the sense of the present invention, any digital processing applied to the datum to be protected and to the datum coming from the physical parameter network (using, if necessary, other data). For simplification, reference will be made to the term "coding" which thus encompasses, in the sense of the present invention, the notions of combination, encryption, etc. to scramble, mask or more generally protect a datum.

According to the present invention, the reading of the datum stored in a memory, internal or external to the integrated circuit chip having made the combination again requires use of the digital word provided by the physical parameter network to be able to decode the protected datum and provide it in the clear to a conventional exploitation circuit.

Preferably, the digital word provided by the physical parameter network is not permanently kept in the integrated circuit but is temporarily generated to only store or read the protected datum. This digital word never comes out of the chip (it is never available on the pads). It is, in a way, self-protected from as soon as the chip is manufactured. Further, it does not need to be known upon writing of the datum to be protected.

In the following, we will refer to the case where the memory storing the protected datum is integrated to the circuit making the combination. It should however be noted that this can be easily transposed to the case of an external memory.

FIG. 1 schematically illustrates, in block diagram form, an embodiment of the storage method according to the present invention.

A datum d to be stored in a coded manner is input (block 1, IN) into the integrated circuit chip. The datum may come from any device external to the integrated circuit chip. A first example of application of the present invention concerns methods using a so-called private key, present in the integrated circuit to be authenticated, and a so-called public key, depending on this private key and stored in an external device. According to this example of application, datum d is formed by the private key which, conventionally, must be permanently stored in the integrated circuit chip (generally in an EEPROM memory). The private key is provided by a secure system when written into the integrated circuit chip.

According to the present invention, datum d is not directly stored in a memory 2 (MEM) but is combined (block 3, COMB) with a so-called physical datum p coming from a measurement (block 4, MES) of a quantity provided by a physical parameter network of the integrated circuit chip. Value f(d, p) which is a function of this combination is stored in memory 2 (for example, an EEPROM). This combination is different from one chip to the other, provided that datum d and/or datum p are different between the two chips.

Figure 2:
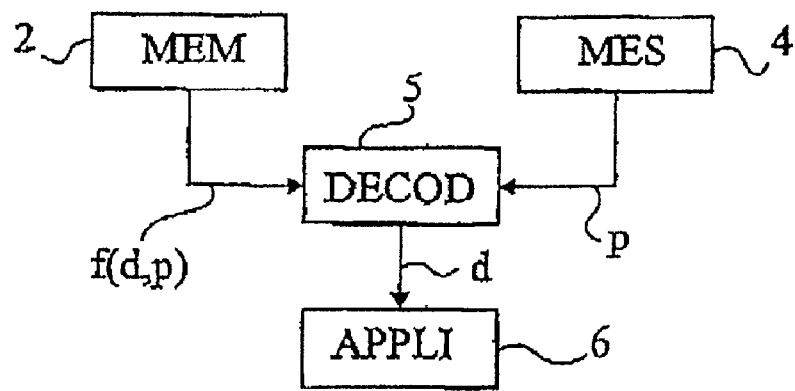
FIG. 2 schematically illustrates, in block diagram form, an embodiment of the method for reading a stored datum according to the present invention.

FIG. 2 illustrates, with a view to being compared to that of FIG. 1, a method for extracting a datum stored in a coded manner by the present invention. The stored datum f(d, p) is read from memory 2 and must be decoded (block 5, DECOD) to be able to provide datum d to the application requiring it (block 6, APPLI). According to the present invention, decoding 5 is performed by applying the inverse operation of the coding, and thus by reusing physical datum p provided, preferably, by a new measurement (block 4, MES) of the quantity provided by the physical parameter network.

According to a preferred embodiment of the present invention, the combination (block 3, FIG. 1) intended to enable storage in coded form of the protected datum is made accessible upon initial storage only. For example, a fuse or an equivalent device may be provided to inhibit the combiner functionality after a first use. This further improves the security against piracy of the protected datum.

An advantage of coding datum d to be stored by means of a quantity provided by a physical parameter network is that the binary word used for the coding is different from one chip to the other, or at least from one chip batch to another chip batch. Accordingly, the binary word representing the stored key is usable only by the chip in which this word has been written upon storing of datum d.

Another advantage of the present invention is that by providing a temporary generation of the binary word provided by the physical parameter network, parameter p which personalizes the coding to each chip cannot be statically obtained by a pirate (that is, it is not visible when not used).

Another advantage of the present invention is that this personalizing parameter is only very seldom used. Indeed, it is only generated upon writing and reading of the protected datum. It is accordingly difficult to be pirated.

Another advantage of the present invention is that physical datum p never comes out of the chip.

Figure 3:
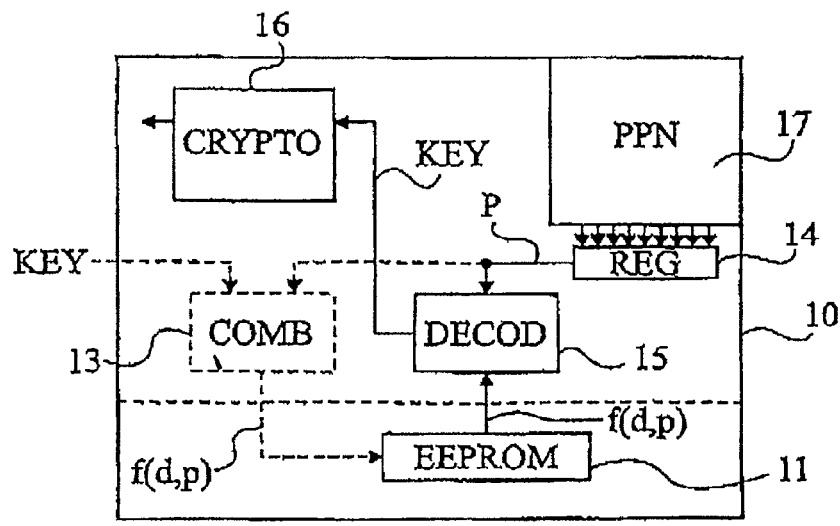
FIG. 3 schematically shows, in block diagram form, a first embodiment of an integrated circuit chip according to the present invention.

FIG. 3 very schematically shows an integrated circuit chip 10 according to a first example of application of the present invention. This example concerns the application of the storage and reading method to the scrambling of a key (for example, a private key of an asymmetrical encryption protocol, RSA) which is to be stored in an EEPROM 11 of chip 10.

Upon personalization of the integrated circuit chip by the introduction of its private key, the key is provided by a secure system (not shown) to a circuit 13 performing the scrambling, masking, coding, encryption, or combination according to the present invention (COMB). Circuit 13 also receives a binary word p coming, for example, from a register 14 (REG) for storing the digital datum linked to a physical parameter network 15 (PPN) integrated with the chip. The result of the combination performed by circuit 13 f(d, p) is provided to EEPROM 11.

According to a preferred embodiment of the present invention, combination circuit 13 is invalidated once the private key has been stored in the EEPROM in a scrambled manner. This is why, in FIG. 3, circuit 13 and the different connections necessary to the storage of the key has been shown in dotted lines. These elements are used for the chip personalization only.

As an alternative, the so-called personalization elements are maintained active to enable registering of protected data during the product lifetime.

To enable reading and exploitation of this stored key by conventional authentication methods, integrated circuit chip 10 includes a decoding circuit 15 giving back the key to a conventional cryptography unit (CRYPTO) 16 representing the application of the protected datum stored by the method of the present invention. Circuit 15 receives, like circuit 13, physical datum p provided by register 14 for each read requirement. It decodes the stored datum f(d, p) coming from the EEPROM to restore the key.

According to a preferred embodiment of the present invention, physical datum p extracted from physical parameter network 17 is only temporarily stored in register 14. According to a first example, a volatile register 14 being deleted when the chip is no longer supplied may be provided. Accordingly, each time the chip comes out of a smart card reader, this datum disappears. According to a second example, temporization means may be provided to have physical datum p disappear from register 14 even while the chip is still in a reader but after a predetermined duration having enabled its exploitation by circuit 15 in read mode.

As an alternative, register 14 is omitted, and the resulting bits of network 17 are directly sent to scrambling and decoding circuits 13 and 15.

Figure 5:
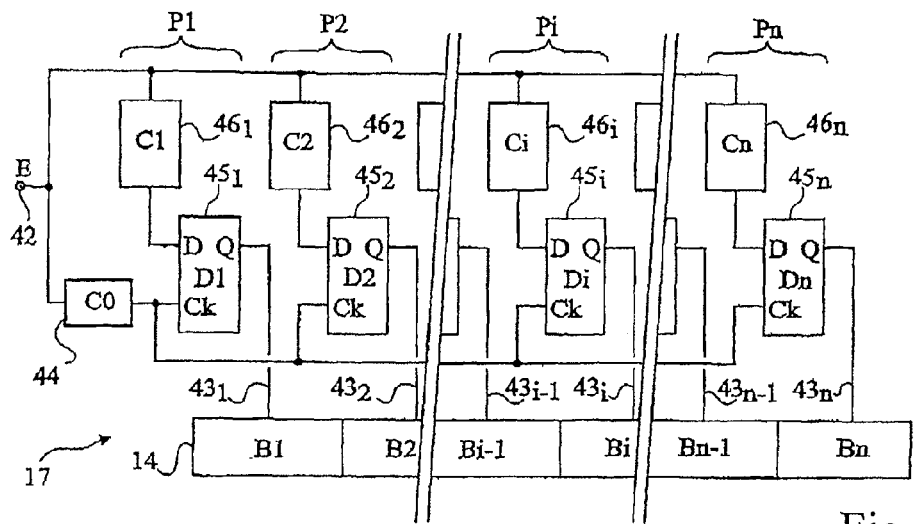
FIG. 5 shows a preferred embodiment of a physical parameter network of an integrated circuit chip according to the present invention.

A preferred embodiment of a physical parameter network will be illustrated hereafter in relation with FIG. 5. However, a conventional physical parameter network including, for example, measuring electric parameters, may also be used. It may be, for example, a measurement of the threshold voltage of a transistor, a measurement of a resistance or a measurement of stray capacitances, a measurement of the current provided by a current source, a time constant measurement (for example, an RC circuit), a measurement of an auxiliary frequency, etc. Since these characteristics are sensitive to technological and manufacturing process dispersions, it can be considered that the electric parameters taken into account are specific to a manufacturing and form, at the very least, a signature of the integrated circuits resulting from this manufacturing, or even an individual signature of each chip. An implementation of a physical parameter network including measuring electric parameters present in the network in the form of resistances, stray capacitances or the like is conventional. Circuits using a time measurement may also be used as a physical parameter network. For example, the read/write time of an EEPROM-type memory is measured. An example of a physical parameter network of this type is described in U.S. Pat. No. 5,818,738. In a preferred embodiment of the physical parameter network which will be described in relation with FIGS. 5 and 6, it will be seen that the physical datum may as desired be linked to a manufacturing batch or personalized from one chip to the other.

Figure 4:
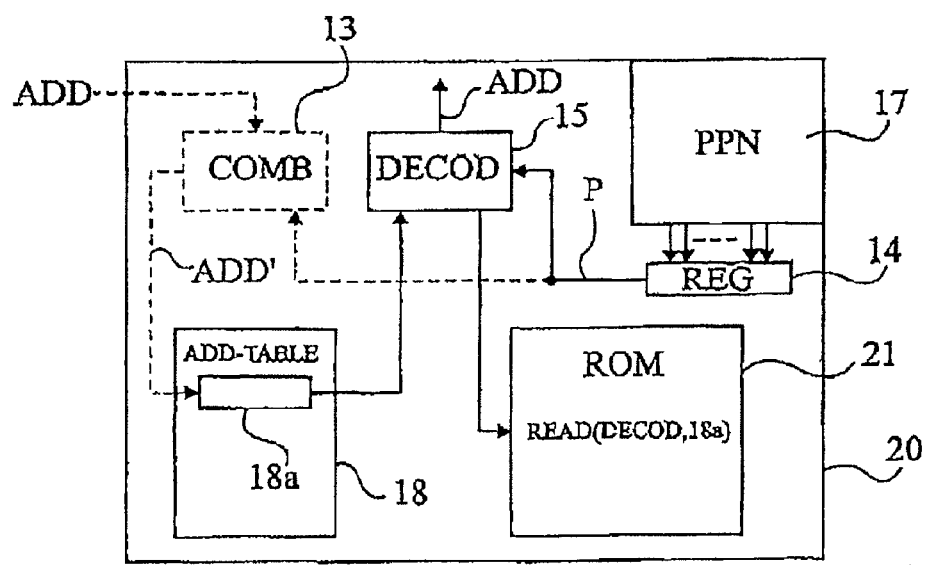
FIG. 4 schematically shows, in block diagram form, a second embodiment of an integrated circuit chip according to the present invention.

FIG. 4 shows an integrated circuit chip 20 illustrating a second example of application of the present invention. According to this example, the datum stored in a protected manner by the implementation of the present invention is an address ADD of a program stored in a non-volatile memory 21 (ROM) of integrated circuit chip 20. This example of application is thus used to protect a program stored in a ROM to avoid unauthorized duplications of this program and make more difficult the piracy or the understanding of the algorithm (for example, an encryption algorithm) used by this program.

As in the example of FIG. 3, an address ADD to be stored in integrated circuit chip 20 is sent onto a combination or coding circuit 13 (COMB). Circuit 13 receives a physical datum coming, as previously, from a register 14 preferably temporarily storing a digital datum provided by a parameter measurement of a physical parameter network 17 (PPN). The result of the combination of address ADD and of datum p is stored in an address table 18 (ADD-TABLE) in the form of a scrambled address ADD'.

Upon writing of the code (program) to be stored in ROM 21, some addresses (for example, those of the peripherals) are replaced with the address of a decoding circuit 15 (DECOD) by being respectively associated with identifiers corresponding to the respective lines of the address table 18 where scrambled address ADD' of the corresponding peripheral will be stored. In the example of FIG. 4, a read operation READ using decoder DECOD 15 and position 18a of table 18 has been illustrated.

Upon personalization of chip 20, combination circuit 13 scrambles the different addresses before storing them in table 18. Only the position of these addresses in table 18 is provided to the chip for their storage.

In a phase of program use, when an execution line uses the address of decoding circuit 15, the circuit starts (with means not shown) the extraction of physical datum p from network 17. Circuit 15 also reads scrambled address ADD' from table 18, from position 18a which is provided thereto by the program execution line. Circuit 15 then provides decoded address ADD to the central processing unit (not shown) which can then execute the required instruction at the real address of the peripheral. It can thus be seen that, by the implementation of the present invention, the addressing is performed indirectly.

An advantage of the present invention in its application to the protection of programs is that sensitive addresses are not stored in the clear in a non-volatile memory.

The disassembling of the code inscribed in this memory thus does not contain the peripheral addresses, which makes more difficult a piracy of the algorithm of the application based on an examination of the program stored in the ROM.

In addition to these advantages specific to the application, the same advantages as those described in relation with the storage of a datum are present. In particular, the coding may be different from one chip to the other, or at the very least from one manufacturing batch to another.

FIG. 5 shows the electric diagram of a preferred embodiment of a physical parameter network according to the present invention. In this example, network 17 includes a single input terminal 42 intended to receive a digital signal E for starting a generation of physical datum p to be stored in register 14. For the implementation of the present invention, signal E must include, as will be seen hereafter in relation with FIGS. 6A and 6B, at least one edge per generation (that is, per need for writing or reading the protected datum from or into memory 11).

Circuit 17 directly provides a binary code B1, B2, . . . , Bi-1, Bi, . . . , Bn-1, Bn over a predetermined number of bits. Each bit Bi is provided on a terminal 431, 432, . . . , 43$i$-1, 43$i$, . . . , 43$n$-1, 43$n$ of circuit 17 which is specific to it. Circuit 17 thus provides the binary code in parallel form.

With each bit Bi of the code is associated an electric path P1, P2, . . . , Pi, . . . , Pn connecting common input terminal 42 to a terminal 43$i$ of same rank.

It can thus already be seen that, by the different delays introduced by the electric paths, the edge which triggers input signal E is reproduced on the different outputs at different times.

It is provided to read the information present at the outputs of circuit 17 in a synchronized way and at a time approximately corresponding to the theoretical average delay between the different electric paths. More specifically, according to the embodiment illustrated in FIG. 5, an average electric path 44 (C0) is provided to set the read time from the occurrence of the edge which triggers input signal E.

For example, path 44 connects input 42 of circuit 17 to the terminals CK of flip-flops 451, 452, . . . , 45$i$, . . . , 45$n$ belonging to respective electric paths P1, P2, . . . , Pi, . . . , Pn and the respective Q outputs of which form output terminals 431, 432, . . . , 43$i$, . . . , 43$n$ of circuit 17. According to this embodiment, each electric path Pi includes a delay element 461 (C1), 462 (C2), . . . , 46$i$ (Ci), . . . , 46$n$ (Pn) connecting input 42 of the circuit to the D input of the corresponding flip-flop in the path. Delay elements 46$i$ are the elements exhibiting, according to the present invention, different delays with respect to one another. Indeed, flip-flops 45$i$ preferably have the same structure. They however take part in the delay brought to the input signal until it reaches the respective output terminals of circuit 17 with respect to delay C0 introduced by element 44.

When an edge is applied on input signal E, this edge reaches the respective D inputs of the flip-flops at different times. The reading of the input state of the different flip-flops is synchronized by the signal edge delayed, this time, by element 44. For this reason, in particular, a delay C0 approximately corresponding to the average delay of the different elements 46$i$ is chosen.

In the example of FIG. 5, the different outputs 43$i$ of circuit 17 are individually connected at the input of a register 14 for storing the obtained binary code, each bit Bi corresponding to one of the circuit outputs.

Figure 6A:
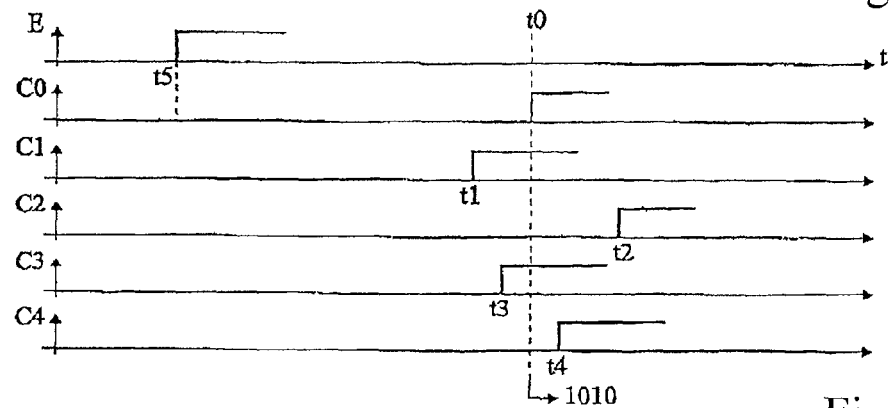
FIGS. 6A and 6B illustrate, in the form of timing diagrams, the operation of the network of FIG. 5.
Figure 6B:
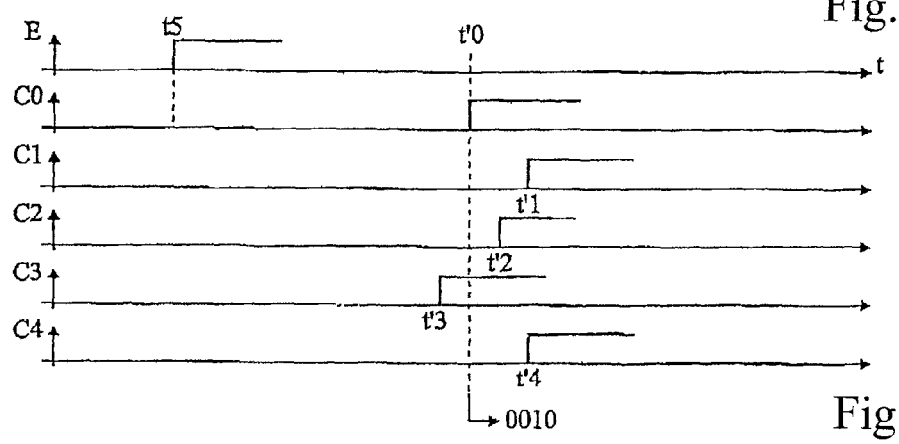

FIGS. 6A and 6B illustrate, in the form of timing diagrams, the operation of network 17 of FIG. 5. FIGS. 6A and 6B show examples of shapes of signal E, and output signals of the different delay elements. In the example of FIGS. 6A and 6B, the case of a binary code over four bits is considered. The timing diagrams have been designated with references C0, C1, C2, C3 and C4.

The difference between FIGS. 6A and 6B represents the difference between two integrated circuits on chips resulting from different manufacturings.

In FIG. 6A, it is assumed that at a time t5, a rising edge is triggered on signal E. This edge appears on the different inputs of the D flip-flops corresponding to the outputs of delay elements C1, C2, C3, and C4 at different respective times t1, t2, t3, and t4. Further, element 44 (C0) introduces a delay starting the data reading at the flip-flop input at a time t0. All paths generating a delay greater than delay C0 provide a bit at state 0 since the edge of signal E has not reached them yet. All paths generating a delay shorter than delay C0 generate a bit at state 1 since the edge of signal E arrives on the input of the corresponding flip-flop before delay C0 has expired. In the example of FIG. 6A, at time t0, code 1010 is provided as scrambling or decoding datum p according to whether datum d is written or read.

FIG. 6B illustrates the same circuit resulting from a different manufacturing process, thus providing a different chip. The code obtained therein is different. For example, it is code 0010. In FIG. 6B, a time t5 identical to the case of FIG. 6A has arbitrarily been shown. However, times t'0, t'1, t'2, t'3, and t'4 at which the edge of signal E is at the end of its way through respective paths C0, C1, C2, C3, and C4 are different from the case of FIG. 6A.

It should be noted that delay element C0 is sensitive to technological and manufacturing process dispersions. This however has no effect upon the implementation of the present invention since this delay represents an average delay and the searched code is arbitrary. Indeed, for the coding of the datum to be stored according to the present invention, what matters is that the physical parameter network generates the same physical datum p upon circuit use as that which has been generated upon storage of the datum to be protected.

Preferably, the delays introduced by the different paths Pi are set (chosen) to be sufficiently close to one another for a technological and manufacturing process dispersion to result in a different code. According to a first example of implementation, all delays are identical for all the chips in a wafer. In this case, the chips of a same batch will provide a same parameter p, which ensures a protection against the series manufacturing of pirate chips. According to a second example of implementation, the delays are different for each chip (with a probability of repetition of course depending on the number of bits of physical datum p). In this case, each chip has a random encryption code which is specific to it and which is almost impregnable. In practice, the paths may be individualized or it may be provided to combine the bits of word p differently from one chip to the other. The differences between the delays may also be reduced by providing them to be identical. They then become very sensitive to technological dispersions and are different from one chip to the other.

As an alternative, the delays introduced by the different paths are chosen to be sufficiently different from one another to be insensitive to technological and manufacturing process dispersions. The physical parameter network is then used as a means for storing the physical datum, which is predetermined. Although this alternative provides less security than the other embodiments, it should however not be excluded. This alternative more specifically applies to an individualization from one chip batch to another, but economical constraints make its application to the individualization from one chip to another in a same batch less advantageous.

To form the delay elements of the electric paths of network 17 of FIG. 5, any integrated element sensitive to technological dispersions or influenced by the manufacturing process may be used. These may be, for example, series of resistors and/or of capacitors, or mere tracks. For the resistors, resistors across the integrated circuit thickness may be used, but it will be preferred to use polysilicon resistors having a value linked to the geometry and which have the advantage of being less temperature-dependent. Of course, the delay elements may take other forms, provided to be preferably sensitive to technological and/or manufacturing process dispersions. Further, the choice of the variation range of the delays introduced by the different elements depends on the application and on the desired sensitivity.

An advantage of the physical parameter network illustrated in FIG. 5 is that it is particularly sensitive. In practice, the detectable difference of the delays introduced by the different paths is on the order of one picosecond. Now, technological manufacturing process dispersions most often introduce differences on the order of at least some ten picoseconds.

Another advantage of the present invention is that in case of a drift in time of one of the delays introduced by the elements, this does not alter the circuit results. Indeed, all delay elements being preferably of similar structure, the dispersion will be in the same direction for all elements (paths).

Another advantage of the physical parameter network of FIG. 5 is that it avoids use of an analog-to-digital converter, as would be required in a physical parameter network measuring, for example, voltage variations. Indeed, binary word p is, in FIG. 5, directly provided by the respective flip-flop outputs.

Of course, the present invention is likely to have various alterations, modifications, and improvement which will readily occur to those skilled in the art. In particular, the type of combination (and thus of decoding) to be applied to the datum to be protected and to the physical parameters will be chosen according to the application from among the various conventional methods. For example, it may be a simple concatenation or addition, or even a more complex encryption algorithm. Further, the size (number of bits) of the physical datum depends on the security desired for the system. Said datum has been illustrated in the form of four bits in the example of FIGS. 5 and 6. It is however generally much greater (on the order of some hundred bits, or even more).

Further, reference has been made to storage registers, which may be replaced with any adapted storage element, for example, memories or memory portions, volatile or not according to the type of data stored. Further, the writing and the reading of data in the storage elements may be performed in series or in parallel.

Further, the practical implementation of the circuits necessary to the implementation of the present invention is within the abilities of those skilled in the art by using conventional techniques and based on the functional indications given hereabove.

Finally, although the present invention has been more specifically described in relation with the use of one datum to be protected and one physical parameter network, it may be provided to use several physical data (words of physical parameters) per integrated circuit chip (for example, by means of several physical parameter networks or by means of a same switchable network). These different words may then, for example, be used to scramble elements of different nature (address, data, key, etc.). It may also be provided to use several decoding and combination circuits using a portion only of a same physical parameter network over a great number of bits, or using one or several logic combinations of the bits of this word. The same alternatives are possible, on the side of the data to be protected where, generally speaking, the method of the present invention applies to any digital datum that is desired to be linked to a support and stored in a memory internal or external to this support. All the discussed alternatives may, of course, be combined.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit, including:
   at least one physical parameter network that provides a physical datum, wherein the physical datum is related to at least one manufacturing parameter of the integrated circuit;
   at least one combiner for coding at least one first datum to be protected by being combined with the physical datum provided by said physical parameter network, wherein:
   the coding provides at least one protected datum,
   the physical parameter network comprises a plurality of electrical paths and the physical datum comprises a plurality of bits, and
   each electrical path from the plurality of electrical paths provides a respective bit from the plurality of bits;
   at least one decoder for, in read mode, decoding the at least one protected datum by reusing the physical datum to provide back the at least one first datum; and
   a first memory for storing said at least one protected datum;
   wherein the at least one combiner is associated with means for invalidating its operation after a writing of the at least one protected datum into a first memory of the integrated circuit.

2. The circuit of claim 1, further including a second memory for storing a program, the first memory being formed by a table of addresses stored in coded form by means of the physical datum.

3. A method for generating a representation of a datum to be stored in an integrated circuit, the method comprising:
   altering the datum based on at least one undetectable physical characteristic of the integrated circuit comprising a physical datum provided by a physical parameter network by coding the datum using the physical datum to obtain an altered datum, wherein:
   the physical datum is related to at least one manufacturing parameter of the integrated circuit,
   the physical parameter network comprises a plurality of electrical paths and the physical datum comprises a plurality of bits, and
   each electrical path from the plurality of electrical paths provides a respective bit from the plurality of bits;
   in read mode, decoding the altered datum by reusing the physical datum to provide the datum; and
   as a result of the decoding, providing the datum to an application;
   wherein altering the datum further comprises processing the datum and at least one value representing the at least one undetectable physical characteristic to generate the representation of the datum to be stored;

wherein the deterministic function is an addition of the datum and the at least one undetectable physical characteristic, and wherein—altering the datum comprises an act of:

adding the datum and the at least one value representing the at least one undetectable physical parameter to generate the representation of the datum to be stored.

4. The method of claim 3 wherein the undetectable physical characteristic of the integrated circuit is related to a manufacturing parameter of the integrated circuit, and wherein altering the datum includes altering the datum based on the manufacturing parameter of the integrated circuit.

5. The method of claim 3, further comprising:

signaling an input of the physical parameter network and reading an output of the physical parameter network so as to obtain a value representative of the undetectable physical parameter.

6. The method of claim 3, wherein altering the datum is performed with an encoder, and wherein the method further comprises disabling the encoder.

7. The method of claim 3, further comprising:

establishing a deterministic function during manufacture of the integrated circuit.

8. The method of claim 3, further comprising:

programming the deterministic function into the integrated circuit after the manufacture.

9. The method of claim 3, wherein the deterministic function includes an encryption algorithm, and wherein altering the datum comprises an act of:

encrypting the datum using the at least one value representing the at least one undetectable physical parameter to generate the representation of the datum to be stored.

10. An integrated circuit to process at least one representation of at least one datum, the integrated circuit comprising:

an encoder configured to alter the at least one datum based on at least one undetectable physical characteristic of the integrated circuit comprising a physical datum provided by a physical parameter network by encoding the at least one datum using the physical datum to obtain an altered datum, wherein:

the physical datum is related to at least one manufacturing parameter of the integrated circuit, the physical parameter network comprises a plurality of electrical paths and the physical datum comprises a plurality of bits, and each electrical path from the plurality of electrical paths provides a respective bit from the plurality of bits;

a decoder configured to decode, in read mode, the altered datum by reusing the physical datum to provide the at least one datum;

wherein the encoder comprises at least two inputs and at least one output, and is configured to perform a deterministic function;

wherein the encoder comprises an encryption circuit and wherein the at least two inputs of the encoder receive the at least one datum and the physical datum provided by the physical parameter network and at least one output outputs the altered datum.

11. The integrated circuit of claim 10, further comprising:

the physical parameter network having an output based on the at least one undetectable physical characteristic of the integrated circuit.

12. The integrated circuit of claim 11, wherein the at least one undetectable physical characteristic of the integrated circuit is related to a manufacturing parameter of the integrated circuit.

13. The integrated circuit of claim 11, wherein the output of the physical parameter network is a multi-bit digital value.

14. The integrated circuit of claim 10, further comprising:

a memory storage device coupled to the encoder and arranged to store the altered datum.

15. The integrated circuit of claim 10, wherein the encoder comprises an adder and wherein the at least two inputs of the encoder receive the at least one datum and the physical datum provided by the physical parameter network and at least one output outputs the altered datum.

* * * * *